United States Patent
Nakahara

(10) Patent No.: US 9,525,796 B2
(45) Date of Patent: Dec. 20, 2016

(54) DEVICE, SYSTEM AND METHOD FOR CONTROLLING DEVICE

(71) Applicant: CANON KABUSHIKI KAISHA, Tokyo (JP)

(72) Inventor: Hidetaka Nakahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/750,069

(22) Filed: Jun. 25, 2015

(65) Prior Publication Data

US 2016/0014285 A1    Jan. 14, 2016

(30) Foreign Application Priority Data

Jul. 8, 2014    (JP) .................. 2014-140869

(51) Int. Cl.
*H04N 1/00* (2006.01)

(52) U.S. Cl.
CPC ...... *H04N 1/00931* (2013.01); *H04N 1/00928* (2013.01)

(58) Field of Classification Search
CPC ............ H04N 1/00928; H04N 1/00931; H04N 1/00344; H04N 1/00244; H04N 1/00954; H04N 1/00933; H04N 1/0097; H04N 1/00973

USPC ................................................. 358/1.13, 1.14
See application file for complete search history.

(56) References Cited

U.S. PATENT DOCUMENTS

| 2010/0195145 A1 | 8/2010 | Adachi |
| 2011/0228311 A1* | 9/2011 | Oguma ................. G06F 21/305 358/1.14 |
| 2012/0081731 A1* | 4/2012 | Suzuki .................. G06F 3/1205 358/1.13 |
| 2012/0167181 A1* | 6/2012 | Yamaguchi ........ H04N 1/00244 726/4 |

FOREIGN PATENT DOCUMENTS

JP        2010-161467 A       7/2010

* cited by examiner

*Primary Examiner* — Allen H Nguyen
(74) *Attorney, Agent, or Firm* — Fitzpatrick, Cella, Harper & Scinto

(57) ABSTRACT

The present invention manages a reset type and a reset condition state, the reset type indicating whether or not a screen reset operation is necessary when each synchronized setting value is synchronized. This information is confirmed when synchronization is performed, and necessary reset processing such as log-out processing is executed if necessary.

10 Claims, 6 Drawing Sheets

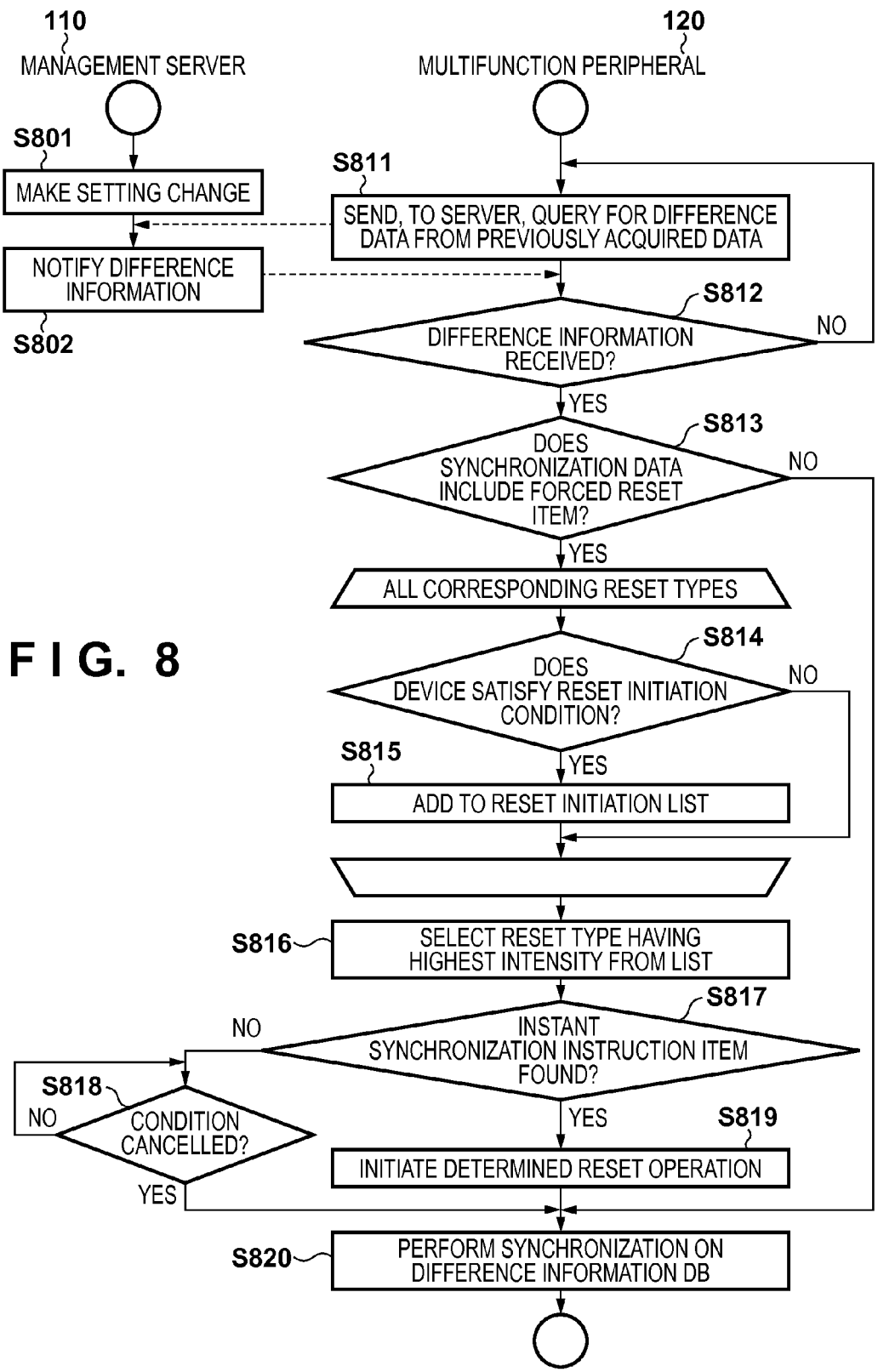
F I G. 8

DEVICE, SYSTEM AND METHOD FOR CONTROLLING DEVICE

BACKGROUND

Technical Field

The present invention relates to an information processing apparatus and an information processing method, and more particularly to a technique for synchronizing setting values between an information processing apparatus and a setting value management server connected via a network.

Description of the Related Art

In recent years, a technique has become available that stores master data regarding the setting values of an information processing apparatus such as a multifunction peripheral in another information processing apparatus, such as a setting value management server, connected via a network so as to perform unified management. The values are synchronized between the multifunction peripheral and the setting value management server, and if a change is made to the values of the master data stored in the setting value management server, the changed value is notified to the multifunction peripheral, and the values of the setting values stored in the multifunction peripheral are also changed. Likewise, if a change is made to the setting values stored in the multifunction peripheral, the setting values of the master data stored in the setting value management server are also changed. In addition, there are setting values that are synchronized between a plurality of multifunction peripherals, and if the value of a setting value is changed, the change is made to the value of the setting value in the master data stored in the server and all of the synchronized multifunction peripherals with which synchronization is performed. This easily enables unified management of a plurality of, for example, several hundreds to several thousands of devices. Accordingly, an administrator managing a group of multifunction peripherals can instantly change the settings of all multifunction peripherals managed by the administrator by simply operating the master data stored in the server.

In many conventional, so-called distribution-type systems that distribute settings data to multifunction peripherals so as to reflect the settings data in the multifunction peripherals, the data distribution and reflection is performed by performing control so as to prevent a user operation and a job input operation of inputting a copy job or a print job from being performed on the multifunction peripherals to which the data is to be distributed. This, however, is not efficient because it causes down time during which the multifunction peripherals cannot be used. In the data synchronization-type system described in the above paragraph, data is synchronized without imposing any limitations on user processing such as user operations and job input operations. This prevents the occurrence of down time, but causes another problem in that a setting change is synchronized and thus may affect the user processing performed by users who are using the multifunction peripherals. Japanese Patent Laid-Open No. 2010-161467 discloses a distribution-type system in which when a setting change made in the server is distributed to the multifunction peripherals, a screen is displayed so that the users can view and recognize the setting change.

With the distribution-type system, user operations are limited during distribution of settings data, and the distributed setting result is displayed with the limitation being maintained. However, in the case of the synchronization-type setting change function that can work without imposing any limitations on the use of multifunction peripherals by the users, simply displaying a setting change is insufficient. For example, the setting change may not be applied to multifunction peripherals currently logged in by their users. In this case, the server may determine that the setting change has been applied to the multifunction peripherals despite the fact that the setting change is not actually applied to the multifunction peripherals.

Embodiments given below will describe a configuration for, when a setting change is made to devices that are managed, enabling the setting change to be made at a time to all of the devices even if there is a device(s) in use.

SUMMARY

A device according to an embodiment of the present invention described below has the following configuration. To be specific, the present invention provides a device including: a storage unit configured to store settings data for each of a plurality of setting items; a receiving unit configured to receive, from a server via a network, difference data between settings data stored in the server and the settings data stored in the storage unit; a processing unit configured to execute reset processing according to a setting item of the received difference data and an operation state of the device; and an update unit configured to update the settings data stored in the storage unit by using the difference data after execution of the reset processing.

Further features of the present invention will become apparent from the following description of exemplary embodiments with reference to the attached drawings.

BRIEF DESCRIPTION OF THE DRAWINGS

FIG. 8 is a flowchart according to a third embodiment.

DESCRIPTION OF THE EMBODIMENTS

Hereinafter, embodiments for carrying out the present invention will be described with reference to the drawings.

First Embodiment

System Configuration

Figure 1:
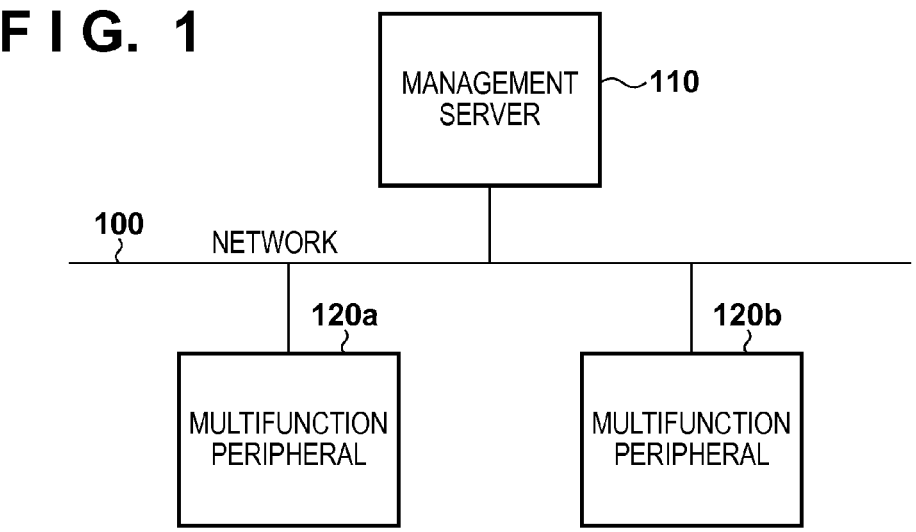
FIG. 1 is a system configuration diagram showing the entirety of a setting value synchronization system.

FIG. 1 is a system configuration diagram showing the entirety of a setting value synchronization system (or device management system) according to the present invention. A management server 110 and multifunction peripherals 120 that are network devices are connected to a network 100. The management server 110 is configured to manage master data regarding the setting values of the multifunction peripherals 120*a* and 120*b*. The setting values are a collection of values (parameters) of setting items with respect to various functions of the multifunction peripherals 120*a* and 120*b*, and control such as control of the functions of the multifunction peripheral, control of user authentication, and the like can be changed according to the setting values. If a change is made to the master data, the management server 110 notifies the multifunction peripherals 120a and 120b of the change information via the network 100. If, on the other hand, the management server 110 receives setting value change information from the multifunction peripheral 120a or 120b, the management server 110 changes the value(s) in its master data. Each multifunction peripheral 120 is a device that implements a plurality of functions (copy, fax and the like), and setting values that are used when executing the functions are stored in the multifunction peripheral 120. If a change is made to the setting values in the multifunction peripheral 120 instead of the management server 110 by, for example, the user, the multifunction peripheral 120 notifies the management server 110 of the change information via the network 100. Specifically, the multifunction peripheral 120 sends, for example, a changed setting item and the setting value thereof. If the multifunction peripheral 120 receives change information of the setting value master data from the management server 110, the multifunction peripheral 120 makes the change in its setting values. Among the setting values, there are setting values that require value synchronization between a plurality of multifunction peripherals such as between the multifunction peripherals 120a and 120b. With respect to these setting values, if a change is made to the master data in the management server 110, the setting value change information is notified to both the multifunction peripherals 120a and 120b. If a change is made to the setting values of either one of the multifunction peripherals 120a and 120b, the change information is first notified to the management server 110, and thereafter notified to the other multifunction peripheral via the management server 110. The management server 110 and the multifunction peripherals 120 will be described later in detail. In the present embodiment, an example will be described in which two multifunction peripherals are used as examples of devices, but the number of multifunction peripherals may be three or more, and the devices to be managed are not limited to multifunction peripherals. However, the devices are required to have common settings.

Figure 2:
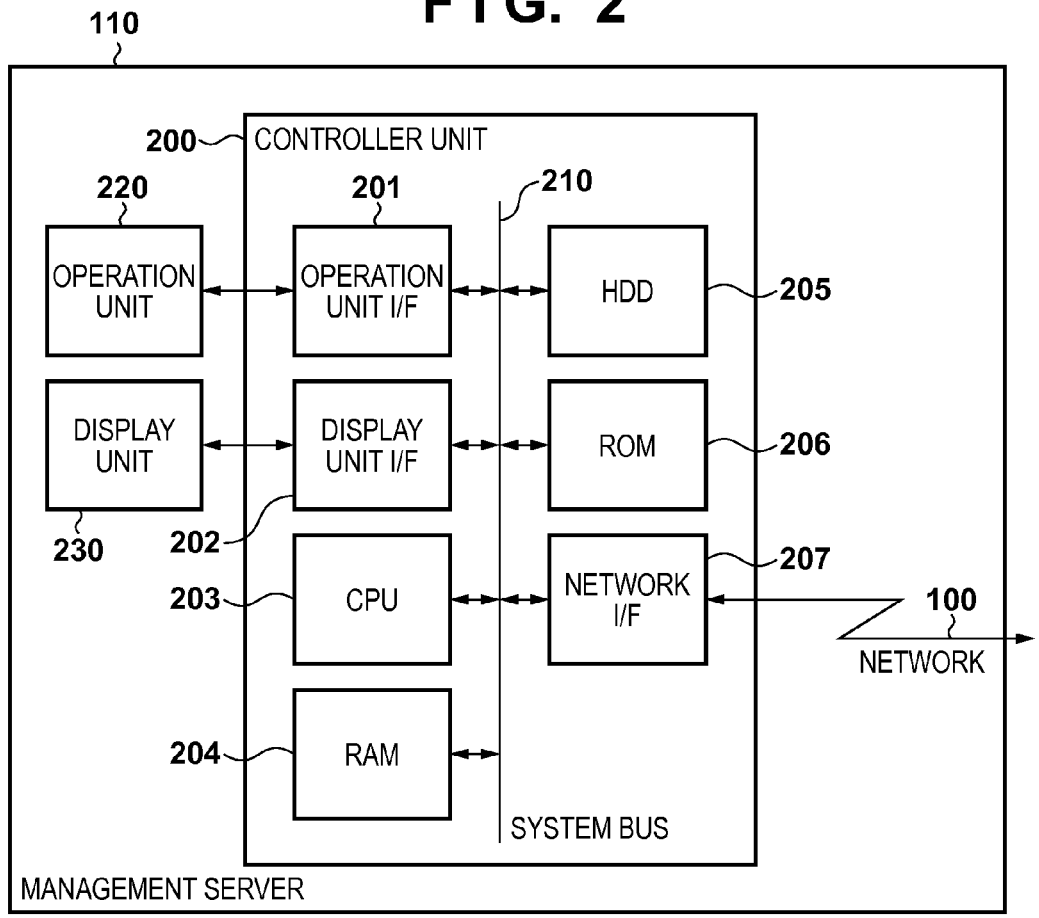
FIG. 2 is a block diagram showing a configuration of a setting value management server.

FIG. 2 is a block diagram showing a configuration of the management server 110 according to the present invention. The management server 110 includes a controller unit 200, an operation unit 220, and a display unit 230. The controller unit 200 includes a CPU (central processing unit) 203, and the CPU 203 activates an OS (operating system) by using a boot program stored in a ROM (read-only memory) 206. The CPU 203 executes, on the OS, an application program stored in a HDD (hard disk drive) 205 so as to execute various types of processing operations. As a work area for the CPU 203, a RAM (random access memory) 204 is used. The HDD 205 stores therein the application program, master data regarding the setting values of the multifunction peripherals 120, and the like. The method for managing the master data will be described later in detail.

The CPU 203 is connected, via a system bus 210, to the ROM 206 and the RAM 204, as well as to an operation unit I/F (interface) 201, a display unit I/F 202 and a network I/F 207. The operation unit I/F 201 is an interface to the operation unit 220 that includes a mouse, a keyboard, and the like, and is configured to send, to the CPU 203, information input by the user via the operation unit 220. The display unit I/F 202 is configured to output image data that needs to be displayed on the display unit 230 composed of a display or the like to the display unit 230. The network I/F 207 is connected to the network 100, and is configured to input and output information to and from the apparatuses that are provided on the network 100 via the network 100.

Figure 3:
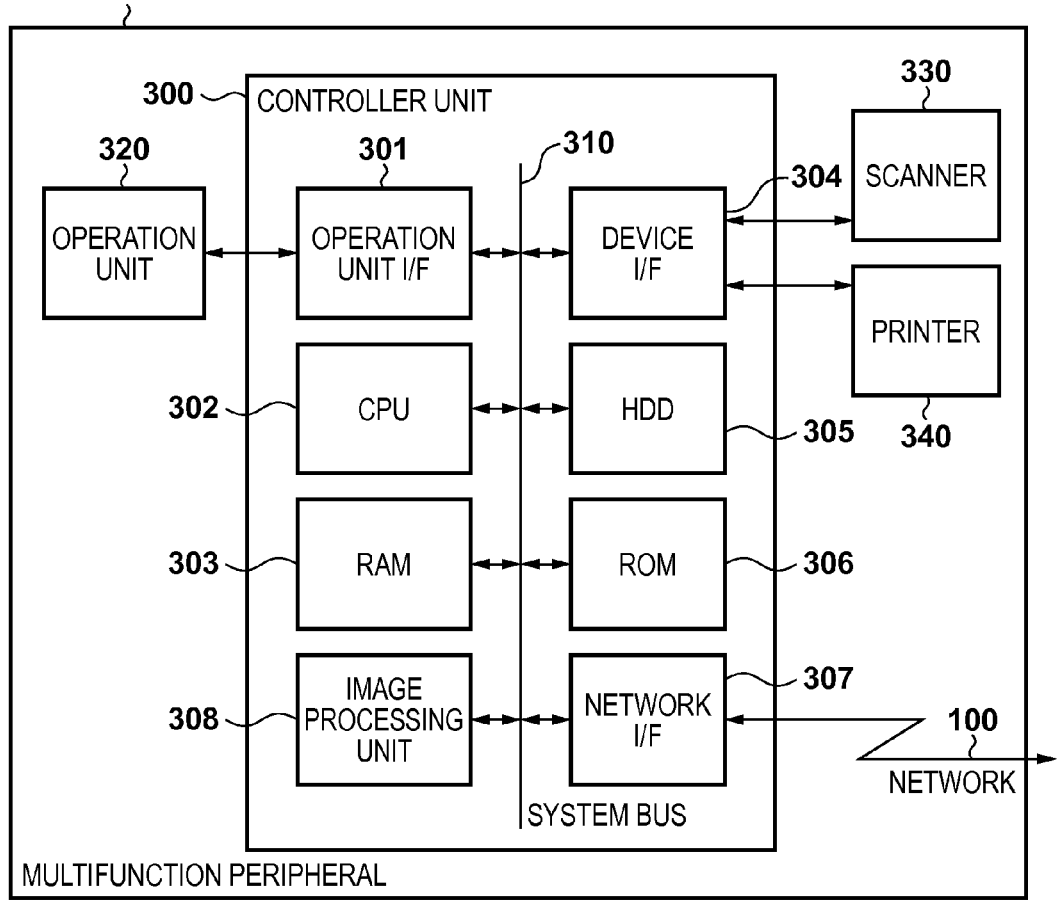
FIG. 3 is a block diagram showing a configuration of a multifunction peripheral.

FIG. 3 is a block diagram showing a configuration of a multifunction peripheral 120 according to the present invention. The multifunction peripheral 120 includes a controller unit 300, an operation unit 320, a scanner 330, and a printer 340. The controller unit 300 is connected to the operation unit 320, and is also connected to the scanner 330 serving as an image input device and to the printer 340 serving as an image output device.

The controller unit 300 includes a CPU 302, and the CPU 302 activates an OS by using a boot program stored in a ROM 306. The CPU 302 executes, on the OS, an application program stored in a HDD 305 so as to execute various types of processing operations. As a work area for the CPU 302, a RAM 303 is used. The RAM 303 provides the work area, and also provides an image memory area for temporarily storing image data. The HDD 305 stores therein the application program, image data and various types of setting values. The method for managing the setting values in the multifunction peripheral 120 will be described later.

The CPU 302 is connected, via a system bus 310, to the ROM 306 and the RAM 303, as well as to an operation unit I/F 301, a device I/F 304, a network I/F 307 and an image processing unit 308. The operation unit I/F 301 is an interface to the operation unit 320 having a touch panel, and is configured to output image data that needs to be displayed on the operation unit 320 to the operation unit 320. The operation unit I/F 301 is configured to send, to the CPU 302, information input by the user via the operation unit 320. The device I/F 304 is connected to the scanner 330 and the printer 340, and the device I/F 304 is configured to perform synchronous or asynchronous conversion of image data. The network I/F 307 is connected to the network 100, and is configured to input and output information to and from the apparatuses that are provided on the network 100 via the network 100. The image processing unit 308 is configured to perform processing operations such as processing for inputting an image from a scanner, processing for output an image to a printer, image rotation, image compression, resolution conversion, color space conversion, and tone conversion. As a configuration example of the management server 110, an ordinary information processing apparatus as shown in FIG. 2 is used, but in the present invention, the management server 110 may be a multifunction peripheral as shown in FIG. 3.

Master Data

Figure 4:
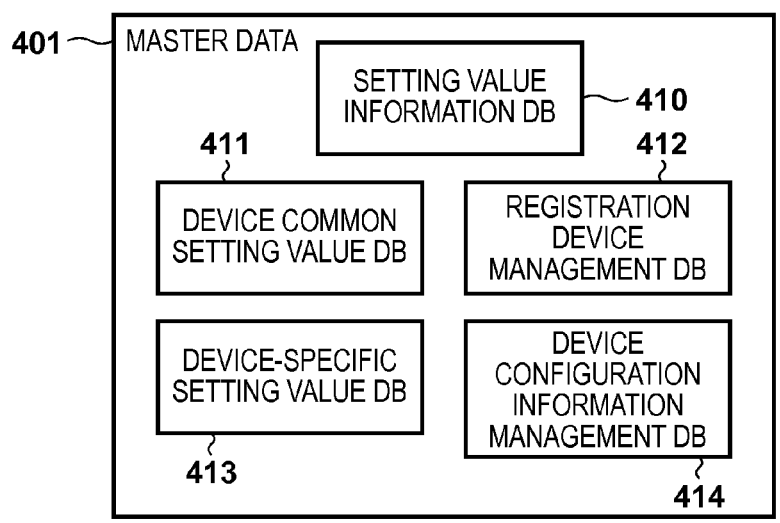
FIG. 4 is a block diagram showing a configuration of master data managed by the setting value management server.

FIG. 4 is a block diagram showing a configuration of master data managed by the management server 110 according to the present invention. Master data 401 includes a setting value information DB 410, a device common setting value DB 411, a registration device management DB 412, a device-specific setting value DB 413, and a device configuration information management DB 414. The setting value information DB 410 is a database in which metadata regarding various setting values of the multifunction peripherals that are managed by the management server 110 is stored. The device common setting value DB 411 is a database for managing setting values used commonly by all of the plurality of multifunction peripherals 120 that are managed by the management server 110 that manages setting values. The registration device management DB 412 is a database for managing individual identifiers of the multifunction peripherals 120 that are managed by the management server 110 that manages setting values. The device-specific setting value DB 413 is a database for managing setting values that are different among the plurality of multifunction peripherals 120 that are managed by the setting value management server that manages setting values. The device configuration information management DB 414 is a database for storing and managing a plurality of device configuration information sets. Details of internal data of each DB will be described later with reference to Tables 1 to 4.

Software Configuration

Figure 5:
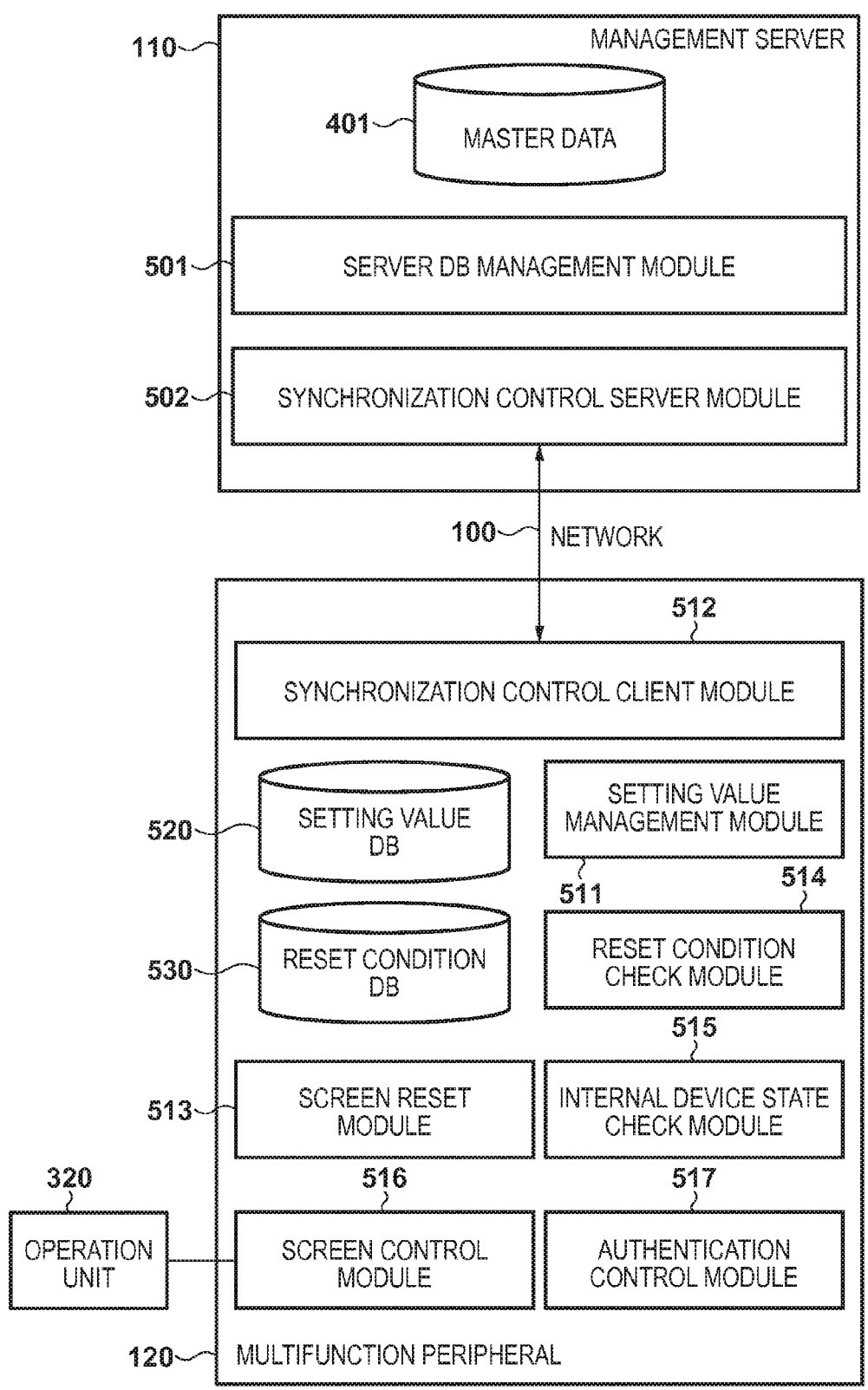
FIG. 5 is a software block diagram of the management server and the multifunction peripheral.

FIG. 5 is a diagram showing examples of software configuration modules of the management server 110 and the multifunction peripheral 120 according to the present invention. The management server 110 includes a server DB management module 501 that edits the master data 401, and all data are edited by this module. Installing a web application that can have access to the module 501 enables browsing of the master DB and data editing. A synchronization control server module 502 receives data acquisition requests and change requests from clients via the network 100, and provides read and write instructions to the server DB management module 501. On the other hand, the multifunction peripheral 120 includes a setting value DB 520, and reading and writing is performed via a setting value management module 511. Although not illustrated in the diagram, all application programs that run on the multifunction peripheral 120 access to the data stored in the setting value DB 520 via the setting value management module 511.

A synchronization control client module 512 performs communication with the synchronization control server module 502 included in the management server 110 via the network 100. The synchronization control client module 512 primarily performs, through periodic polling, an operation of causing changes made in the DB included in the server to be entered into the multifunction peripheral, and an operation of causing updates made in the setting value DB 520 included in the multifunction peripheral to be reflected in the DB included in the server. In the present invention, a series of the operation of causing changes made in the setting value DB 520 to be reflected in the master data 401 and the operation of detecting changes made in the master data 401 and causing the changes to be reflected in the setting value DB 520 is referred to as "synchronization control".

A screen reset module 513, a reset condition check module 514, and an internal device state check module 515 will be described later in detail. The reset condition check module 514 determines, based on information stored in the internal device state check module 515 and a reset condition DB (reset condition database) 530, whether the current state corresponds to a reset condition, and the screen reset module 513 issues an instruction to transition to a specific screen to a screen control module 516 based on the determined result. This operation will be described later in detail with reference to a flowchart.

The screen control module 516 displays a predetermined screen on the operation unit 320 of the multifunction peripheral, and transitions the screen in response to an operation performed by the user on the screen. The screen control module 516 displays the content of settings on the operation unit 320 by using the setting value management module 511, and if a setting change is made by the user, issues an instruction to rewrite the content of the setting value DB 520 to the setting value management module 511.

An authentication control module 517 performs control for login to the multifunction peripheral. The authentication control module 517 is a module that includes a DB for authentication within the device or outside the device such as an active directory, and is configured to perform authentication for users who use the multifunction peripheral. An authentication operation is also performed based on authentication information input from a user via the screen control module 516. As used herein, "authentication" refers to a function of authenticating an individual based on a user account, a password and the like of the individual who is to use the multifunction peripheral that are input on a screen (log-in screen), and allowing the authenticated individual to use the multifunction peripheral by using the rights and personal information of the identified individual. Hereinafter, "log-in" refers to an action of performing authentication on the multifunction peripheral, "currently log-in" refers to a state in which the authentication action has been completed, and the multifunction peripheral is used by the identified individual, "log-out" refers to a state in which the authentication state has been cancelled, and the multifunction peripheral performs transition so as to display an authentication screen for log-in. After a log-in, rights and personal settings corresponding to a role defined with respect to the log-in user are loaded, and the user can use the multifunction peripheral by using the loaded information. After a log-out operation, the loaded information is discarded, and the multifunction peripheral transitions to a stand-by state to wait for a subsequent user to log in.

Databases in Master Data

Next, an internal view of each data storage will be described with reference to tables.

TABLE 1

| Key identifier | UI indication | Initial value | Value range | Available model/ firmware version | Display condition |
|---|---|---|---|---|---|
| user_auth_settings.auth_onoff | Authentication function | 0 | 0-1 | Model A: all Model B: all Model C: Ver. 3.0 or later | Authentication license |
| user_auth_settings.access_mode | Access mode | 1 | 0-5 | Model A: all Model B: Ver. 2.0 or earlier | |
| user_auth_settings.access_mode | Access mode | 0 | 0-3 | Model B: Ver. 2.1 or later Model C: all | |
| . . . | | | | | |

Table 1 shows an example of data stored in the setting value information DB 410. The setting value information DB 410 is a database in which metadata regarding various setting values managed by the management server 110 is stored. In the setting value information DB 410, a key identifier for identifying the setting item used when communication is established with the multifunction peripheral 120, a UI indication used when the setting value is presented to the user, an initial value, a value range, available model/version, and a setting value display condition are stored for each setting item. The setting values managed by the setting value information DB 410 may vary depending on the model or firmware version of the multifunction peripheral 120 such as the presence or absence of a setting value, and variations in the value range and initial value of the setting value. Here, an example is shown in which a setting value having a key identifier represented by "user_auth_settings.auth_onoff" is present in all devices of model A and model B, but in devices of model C, the setting value is present only in devices whose firmware version is 3.0 or later. Another example is also shown in which a setting value having a key identifier represented by "user_auth_settings.access_mode" has different value ranges and initial values depending on the version of the firmware installed on devices of model B.

TABLE 2

| Key identifier | Value |
| --- | --- |
| user_auth_settings.auth_onoff | 0 |
| user_auth_settings.access_mode | 5 |
| . . . | |

Table 2 shows data stored in the device common setting value DB 411. The device common setting value DB 411 is a database for managing values of setting items used commonly by all of the plurality of multifunction peripherals 120 that are managed by the management server 110 that manages setting values. In the device common setting value DB 411, key identifiers of each setting item and values corresponding to the key identifiers are stored. The key identifiers are identifiers having the same syntax as the key identifiers of the setting value information DB 410.

TABLE 3

| Key identifier | Value |
| --- | --- |
| user_auth_settings.c_login | 1 |
| copy_settings.force_mono_print | 1 |
| . . . | |

Table 3 shows data stored in the device-specific setting value DB 413. The device-specific setting value DB 413 is a database for managing setting items having different values among the plurality of multifunction peripherals 120 that are managed by the setting value management server that manages setting values. It is assumed here that there are a plurality of device-specific setting value DBs 413 that respectively correspond to the multifunction peripherals. In the device-specific setting value DB 413, key identifiers and values corresponding to the key identifiers are stored. The key identifiers are identifiers having the same syntax as the key identifiers of the setting value information DB 410. With the device-specific setting value DB 413, it is possible to manage, not only the setting items having specific values, but also setting items that are specific to individual multifunction peripherals.

TABLE 4

| Attribute | Value |
| --- | --- |
| Device identifier | Device 1 |
| Model name | Model A |
| Firmware version | 2.1 |
| License | Authentication |
| Accessory | Finisher X |

Table 4 shows the content of device configuration information managed by the device configuration information management DB 414 for each multifunction peripheral. The device configuration information management DB 414 is a database in which a plurality of such device configuration information sets are stored and that manages the information sets. The device configuration information shown here includes individual identifier for identifying each individual multifunction peripheral 120, model name, firmware version, license information indicating an available function, and optional accessory such as finisher. The model name, firmware version and the license have the same syntax as those stored in the setting value information DB 410.

The registration device management DB 412 is a database for managing individual identifiers of the multifunction peripherals 120 that are managed by the management server 110 that manages setting values. In the configuration shown in FIG. 1, a list of individual identifiers of the multifunction peripherals 120a and 120b are registered in the registration device management DB 412.

The management server 110 can collectively manage setting values that are different among the multifunction peripherals 120 that are managed by the management server, setting values that are common among all of the multifunction peripherals 120 that are managed by the management server, and metadata of various setting values by using the above-described databases included in the master data 401.

Databases in Multifunction Peripheral

TABLE 5

| Key identifier | Value | UI indication | Initial value | Value range | Display condition |
| --- | --- | --- | --- | --- | --- |
| user_auth_settings.auth_onoff | 1 | Authentication function | 0 | 0-1 | Authentication license |
| user_auth_settings.access_mode | 4 | Access mode | 1 | 0-5 | |
| . . . | | | | | |

Table 5 shows an example of a configuration of the setting value DB 520 stored in the HDD 305 of the multifunction peripheral 120 according to the present embodiment. The setting value DB 520 is a database in which setting values used by the multifunction peripheral 120 are stored. The setting values stored in the setting value DB 520 include elements such as key identifier for identifying each setting item, setting item value (current value), UI indication, initial value, value range, display conditions, and the like. These elements are managed by the same syntax as those managed by the master data 401. If a change is made to a setting value in the management server 110 or the multifunction peripheral 120, the setting value is synchronized by transmitting at least the key identifier and the value included in the data of the setting value DB 520 through communication.

TABLE 6

| Key identifier | Value | Reset type | Condition state | Reset operation |
|---|---|---|---|---|
| user_auth_settings.auth_onoff | 1 | Log-out | Unauthenticated state | Log-in screen transition |
| user_auth_settings.auth_onoff | 0 | Log-out | Currently log-in | Forced log-out |
| user_auth_settings.access_mode | — | Log-out | Currently log-in | Forced log-out |
| user_auth_settings.c_login | — | Log-out | Currently log-in | Forced log-out |

Table 6 shows an example of a configuration of the reset condition DB 530 stored in the HDD 305 of the multifunction peripheral 120 according to the present embodiment. The reset condition DB 530 is a database that is referred to by the reset condition check module 514 when the reset condition check module 514 determines whether or not to perform a reset operation. The items stored in the reset condition DB 530 include key identifier for identifying each setting item, write value for entering a reset condition, reset type, internal device condition state for performing a reset operation, and specific reset operation specification, which are normalized data. The setting items registered in the reset condition DB 530 are also referred to as "forced reset attribute items".

The items defined in the reset condition DB 530 will be described specifically. Here, as the reset type, "log-out" is mostly defined. It means that with respect to a setting value that may cause an inconsistency for a user who is currently logging in if rewriting is performed, a reset operation is performed such that the user is forced to log out. This is a precaution to prevent the occurrence of an inconsistency because there is a possibility that, if a change is made to authentication settings while there is a user who is currently logging into a multifunction peripheral, an inconsistency may occur between the user operations and the settings of the multifunction peripheral unless the user is forced to log out and thereafter log in to operate the multifunction peripheral with new settings.

The reason that a log-out is forced as described above is to apply a setting change at a time to the plurality of multifunction peripherals that are managed so as to implement the same authentication scheme and authentication settings, and it is not appropriate in terms of management if there is a multifunction peripheral in which the setting change is not reflected. Under the circumstances, this setting item that defines the reset type to "log-out" is considered to be used in a group of settings related to authentication among various types of settings of the multifunction peripheral, specifically, for example, the following settings:

(1) a setting to switch whether or not to perform authentication;
(2) settings regarding the authentication scheme;
(3) settings regarding access control after authentication; and
(4) settings regarding the use of personal data that can be used by each authenticated user.

It is unnecessary to define, in the reset condition DB 530, setting values of the multifunction peripherals other than those described above such as, for example, sleep settings, network settings, and various function control settings because even if there is a user who is currently logging in, a change can be instantly reflected in operations without having to force the user to log out.

Reset Procedure when Setting Change is Made

Figure 6:
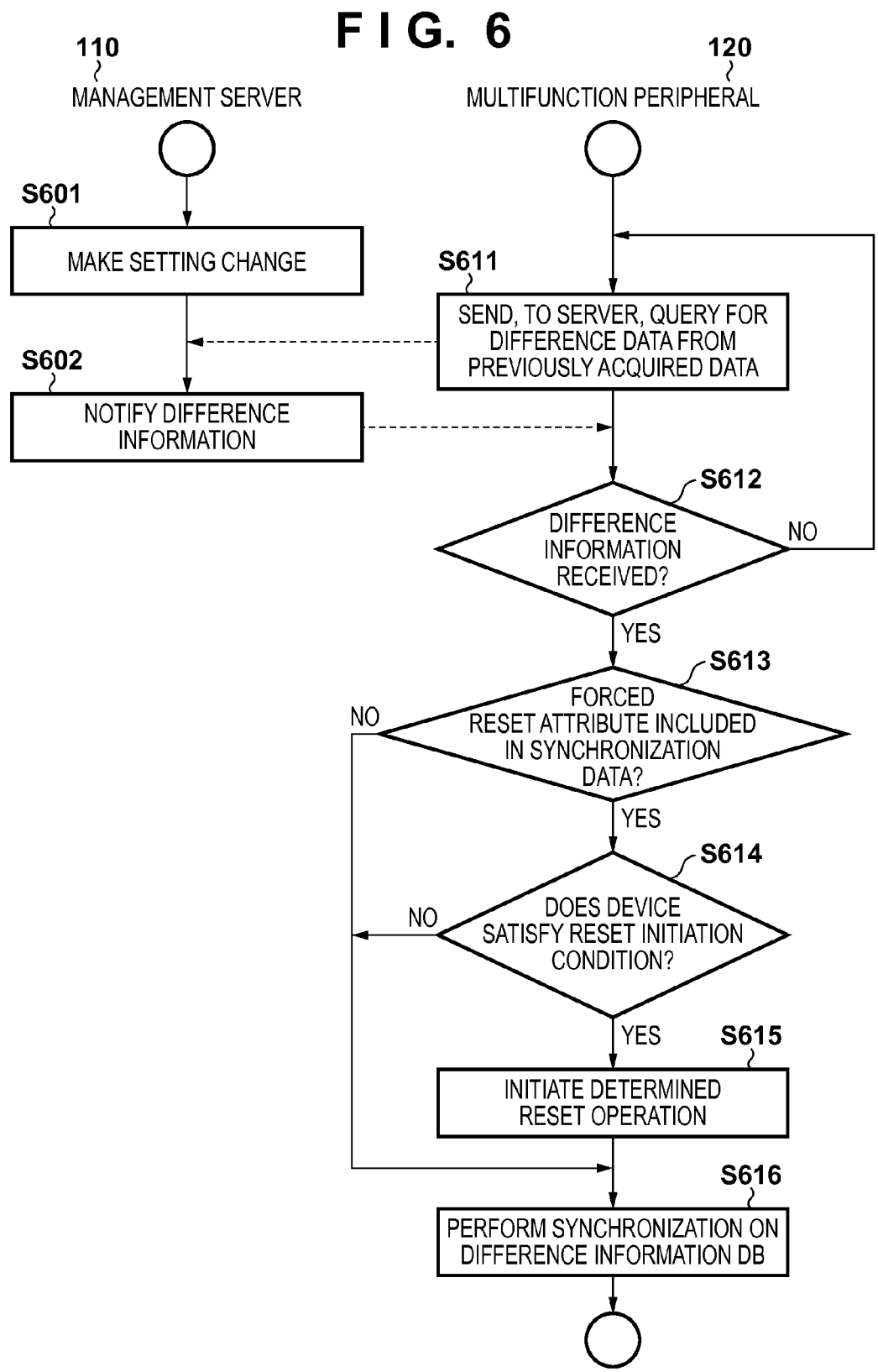
FIG. 6 is a flowchart according to a first embodiment.

FIG. 6 is a flowchart illustrating processing from synchronization of settings data between the management server 110 and the multifunction peripheral 120 to initiation of a reset operation. In the present embodiment, the modules shown in FIG. 5 and used in this flowchart are implemented by a CPU executing a program stored in a RAM, a ROM, a HDD or the like. The procedure shown in the flowchart is also illustrated as operations of the modules, but is implemented by a CPU executing a program stored in any one of storage means RAM, ROM and HDD. In FIG. 6, a description will be given focusing on one multifunction peripheral, but all of the managed multifunction peripherals execute the same operations.

In step S601, in response to an instruction from an administrator user to the management server 110, the server DB management module 501 rewrites the device common setting value DB 411 or the device-specific setting value DB 413 so as to perform an operation of changing settings information of the multifunction peripheral. The multifunction peripheral, on the other hand, polls a change made in the settings data of the master data 401 through polling. In step S611, the synchronization control client module 512 issues, to the synchronization control server module 502 of the server, a query for a difference in the change after the final synchronization time. In step S602, the synchronization control server module 502 that received the query notifies update difference information.

In step S612, the synchronization control client module 512 determines whether or not the difference information has been acquired. If it is determined that the difference information has not been acquired, the synchronization control client module 512 updates the final update time and waits for the next polling period, and the procedure returns to step S611. If it is determined that the difference information has been acquired, the procedure proceeds to step S613. In step S613, the reset condition check module 514 refers to the acquired difference information (also referred to "synchronization information") and the reset condition DB 530, and determines whether the difference information includes a setting item (or in other words, a forced reset attribute item) that requires a reset operation. To be specific, the reset condition check module 514 determines whether or not a key identifier and the corresponding value stored in the reset condition DB 530 are included in the received difference information. If it is determined that a key identifier and the corresponding value stored in the reset condition DB 530 are not included in the difference information, the procedure proceeds to step S616, where the content of the setting value DB 520 is updated via the setting value management module 511. If, on the other hand, it is determined in step S613 that a forced reset attribute item is included in the received difference information, the procedure proceeds to step S614. In step S614, the reset condition check module 514 determines whether or not the device (multifunction peripheral) is currently in a reset operation initiation condition based on the content of the reset condition DB 530 and a query issued to the internal device state check module 515. To be specific, the reset condition check module 514 reads, from the reset condition DB 530, the value written under "condition state" column of the forced reset attribute item included in the received difference information, and determines whether or not the current device state matches the condition written under "condition state" column. If the current device state matches a plurality of items, the determination is made with respect to all of the items. If the current device state matches none of the items, the procedure proceeds to step S616, where the content of the setting value DB 520 is updated via the setting value management module 511. If there is a condition that matches the current device state, the procedure proceeds to step S615, where the determined reset operation is initiated by providing an instruction to the screen reset module 513. The determined reset operation refers to a reset operation specified by the values under "reset type" column and "reset operation" column written in the corresponding record stored in the reset condition DB 530. After that, the procedure proceeds to step S616, where the content of the setting value DB 520 is updated via the setting value management module 511.

As an example of the reset operation, "forced log-out" is shown in Table 6. The forced log-out is performed by, for example, the following procedure: upon start of forced log-out processing, a display is shown on a user interface of the multifunction peripheral so as to inform the user that all information input by the log-in user will be invalidated, and a forced log-out operation will be performed. Then, in response to receiving an input of confirmation from the user, forced reset processing is performed after the input of confirmation. If execution of a job such as a print job or a scan job has already started, the forced log-out processing may be performed after completion of the job, or the forced log-out processing may be performed by interrupting the job. In this case as well, before the forced log-out processing is performed, information indicating that a forced log-out operation will be performed is provided to the log-in user, and after receiving an input of confirmation, the log-out processing is performed. However, a situation can be conceived in which an input of confirmation is not made due to an absence of the user or other reasons. Accordingly, the forced log-out processing may be performed if a predetermined period of time passes after the information is displayed on the user interface, irrespective of the presence or absence of an input of confirmation. Also, the invalidation of input information and the interruption of the job described above may be defined as a reset operation other than the forced log-out processing. In this case, as the reset operation in the reset condition DB 530 shown in Table 6, "invalidation of input information" and "job interruption" are registered, and the multifunction peripheral 120 is configured to execute operations corresponding thereto.

A specific example will be given here. For example, a case will be considered where the reset condition DB 530 includes Table 6, and the difference data received from the server indicates an update of changing the item having a key identifier represented by "user_auth_settings.auth_onoff" to "0". The setting item "user_auth_settings.auth_onoff" is a setting for determining whether or not to perform log-in authentication, and thus the setting change that changes this setting value from 1 to 0 means to change the setting that requires log-in authentication to the setting that does not require log-in authentication. In this case, to the value "0" of the key identifier represented by "user_auth_settings.auth_onoff" is written in the second row in Table 6. Referring to the content of the reset condition DB 530, the corresponding condition state is "currently log-in", and thus it is determined whether or not the current state corresponds to a state in which the user is currently logging in. Then, if it is determined that the current state corresponds to the user log-in state, a procedure according to the corresponding reset operation "forced log-out" is executed to force the user to log out. A series of above-described operations is performed in this way. After that, the user can use the multifunction peripheral without having to go through log-in authentication. This is the end of the description of the first embodiment of the present invention.

As described above, according to the present embodiment, if a setting change that changes the value of a predetermined setting item of a network device such as a multifunction peripheral to a predetermined setting value is performed in a predetermined state, a predetermined reset operation can be executed. With this configuration, even if a setting change that requires a reset operation is made to a plurality of network devices that are managed, the setting change can be reflected substantially simultaneously at a time in the devices for which the setting change is made, and the devices can be operated according to the settings to which the changed setting has been reflected. To be specific, even if a setting change that requires a re-login is made to a device currently logged in by its user, the user is forced to log out of the device, and thus the settings to which the changed setting has been reflected can be immediately applied to a new log-in user. Accordingly, down time does not occur in the multifunction peripheral.

Second Embodiment

A second embodiment of the present invention will be described next. In the first embodiment, an operation of performing control so as to prevent a user operation from being executed in an inappropriate setting state by automatically and forcibly executing a screen reset operation such as log-out even during user operation was described, but depending on the settings, there are items that may not require a change to be instantly reflected. In order to control such items, in the second embodiment, the reset condition DB 530 is expanded, and a determination flow is added. In the second embodiment, the hardware and software configurations shown in FIGS. 1 to 6 and the DB configurations of the server shown in Tables 1 to 5 in the first embodiment are used.

TABLE 7

| Key identifier | Value | Reset type | Condition state | Reset operation | Instant reflection |
|---|---|---|---|---|---|
| user_auth_settings.auth_onoff | 1 | Log-out | Unauthenticated state | Log-in screen transition | ○ |
| user_auth_settings.auth_onoff | 0 | Log-out | Currently log-in | Forced log-out | ○ |
| user_auth_settings.access_mode | — | Log-out | Currently log-in | Forced log-out | X |
| user_auth_settings.c_login | — | Log-out | Currently log-in | Forced log-out | X |

Table 7 is a DB obtained by adding control information that indicates whether or not to instantly reflect a setting change to the reset condition DB 530 described in the first embodiment. This information may be statically determined, or may be configured to be changeable by an administrator user or the like through the screen control module or the like. If the instant reflection setting is turned on, the reset operation is instantly performed after the setting change has been made.

Figure 7:
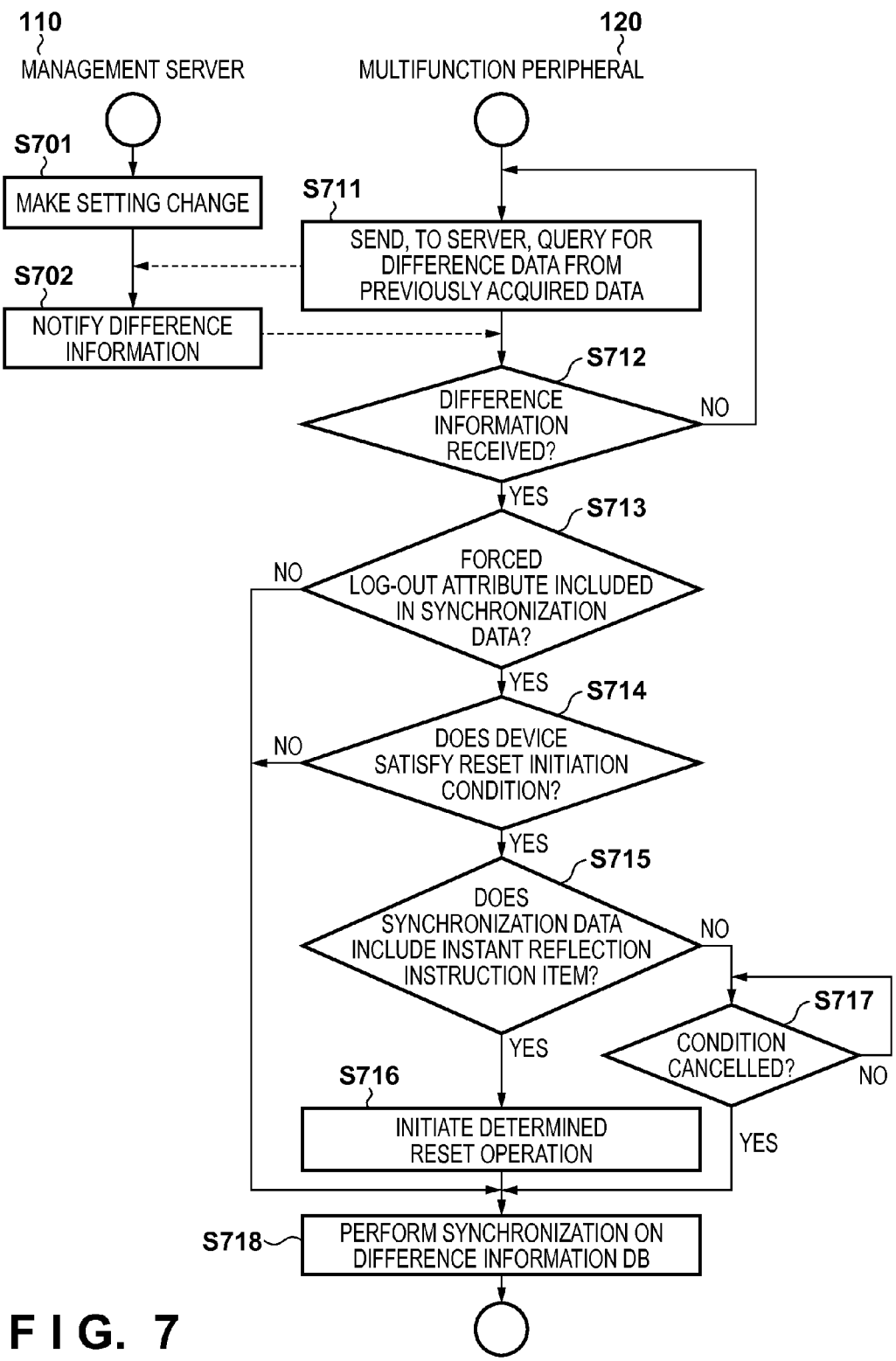
FIG. 7 is a flowchart according to a second embodiment.

FIG. 7 is a flowchart obtained by adding a control operation in accordance with a determination made using the reset condition DB 530 structured as in Table 7 as to whether or not to perform an instant reflection operation. Steps S701 to S714 are the same as steps S601 to S614 shown in FIG. 6 of the first embodiment, and thus a description thereof is omitted here.

In step S714, if the reset condition check module 514 determines, with respect to the received setting change, that the current device state is in a condition for initiating a reset operation, or in other words, that the current state corresponds to a state written under "condition state" column, the procedure proceeds to step S715.

In step S715, the reset condition check module 514 checks, with respect to the key identifier that matches the initiation condition, whether or not an instant reflection instruction is found in the reset condition DB 530. If it is determined that an instant reflection instruction is found (or in other words, the instant reflection setting is on), the procedure proceeds to step S716, where an instruction is provided to the screen reset module 513, and the corresponding reset operation registered in the DB 530 is executed. After that, the procedure proceeds to step S718, where the content of the setting value DB 520 is updated via the setting value management module 511.

If it is determined, in step S715, that an instant reflection instruction is not found, the procedure proceeds to step S717. In step S717, the internal device state check module 515 waits for the internal device state that matches the initiation condition to be cancelled. That is, if the condition state is "currently log-in", the internal device state check module 515 waits for cancellation of the state, or in other words, a log-out operation to be performed. If cancellation is confirmed, the procedure proceeds to step S718, where the content of the setting value DB 520 is updated via the setting value management module 511.

The present embodiment is obtained by modifying the first embodiment so as to enable a selection to choose whether to instantly reflect the change or to wait for the reset initiation condition to be cancelled by checking the presence or absence of an instant reflection instruction in step S715. To be specific, it is possible to wait for setting synchronization/reflection to be performed such as waiting for the user to log out.

Third Embodiment

Next, a third embodiment of the present invention will be described. In the first and second embodiments, a configuration was described in which control is performed so as to perform only a log-out operation as the reset type, but according to the present invention, a screen reset operation other than log-out can be defined. The screen reset operation is an operation of making a transition to a specific screen, and includes, for example, processing of causing a screen on which an input operation is performed to transition to its initial screen, or the like. The third embodiment is configured such that, a plurality of reset types are defined in the reset condition DB 530, and a flow of operations is added that is performed when the plurality of reset types are included and synchronization is performed at a time. In the third embodiment, the hardware and software configurations shown in FIGS. 1 to 6 and the DB configurations of the server shown in Tables 1 to 5 in the first and second embodiments are used.

Table 8 is a DB in which a plurality of reset types are defined in the reset condition DB 530 described in the second embodiment. This information may be statically determined, or may be configured to be changeable by an administrator user or the like through the screen control module or the like. Table 9 is a table showing the reset intensity defined with respect to the defined reset types, and the intensity is defined for each type of reset operation. In this example, "1" indicates the strongest intensity, and the intensity decreases as the number increases. The reset intensity can also be referred to as "reset range", and the reset intensity increases as the reset range increases. In the third embodiment, this reset intensity table is also stored in the reset condition DB 530.

TABLE 8

| Key identifier | Value | Reset type | Condition state | Reset operation | Instant reflection |
|---|---|---|---|---|---|
| user_auth_settings.auth_onoff | 1 | Log-out | Unauthenticated state | Log-in screen transition | ○ |
| user_auth_settings.auth_onoff | 0 | Log-out | Currently log-in | Forced log-out | ○ |
| user_auth_settings.access_mode | — | Log-out | Currently log-in | Forced log-out | X |
| user_auth_settings.c_login | — | Log-out | Currently log-in | Forced log-out | X |
| copy_settings.force_mono_print | — | Copy screen reset | Copy screen displayed | Screen reset | ○ |
| send_settings.force_mono_scan | — | Send screen reset | Send screen displayed | Screen reset | ○ |
| device_settings.acc_service_offon | — | All settings screen reset | ANY setting screen | Screen reset | ○ |

TABLE 9

| Reset type | Reset intensity |
|---|---|
| Log-out | 1 |
| All screens reset | 2 |
| Copy screen reset | 3 |
| Send screen reset | 3 |

FIG. 8 is a flowchart obtained by adding a control operation of determining, based on the reset condition DB 530 structured as shown in Table 9, whether or not to perform an instant reflection operation. Steps S801 to S812 are the same as steps S701 to S712 shown in FIG. 7, and thus a description thereof is omitted here.

In step S813, the reset condition check module 514 compares the acquired difference information with the reset condition DB 530, and determines whether the difference information includes a change that has been made to the item designating the reset type or an item (forced reset setting item) that requires a reset operation. If it is determined that such items are not included, the procedure proceeds to step S820, where the content of the setting value DB 520 is updated by using the difference information via the setting value management module 511. If it is determined in step S813 that a forced reset setting item is included, the subsequent iterative processing is performed, but here, the following steps will be described by assuming that a plurality of forced reset setting items are included.

If a plurality of setting items defining a plurality of different reset conditions are included in the synchronization data, the following processing is carried out with respect to each setting item. In step S814, the reset condition check module 514 determines whether the current device state matches a condition for initiating a reset operation by comparing "condition state" column of the reset condition DB 530 with the device state obtained by sending a query to the internal device state check module 515. If it is determined that the device state matches a reset initiation condition state, the procedure proceeds to step S815, where the corresponding reset operation is added to a reset initiation list. Steps S814 and S815 are repeatedly performed with respect to all setting items that satisfy a reset initiation condition. However, with respect to the overlapping reset type, it is unnecessary to repeat the processing, and thus it is sufficient that the processing is repeated a number of times corresponding to the number of reset types.

After that, in step S816, the reset condition check module 514 checks the reset types written in the stored reset initiation list so as to select a reset operation having the highest intensity by referring to the reset intensity information included in the reset condition DB 530, and then decides the selected reset operation as the reset type to be initiated, and the procedure proceeds to step S817.

In step S817, the reset condition check module 514 determines, with respect to the key identifier that matches the initiation condition, whether or not an instant reflection instruction is found in the reset condition DB 530. If it is determined that an instant reflection instruction is found, the procedure proceeds to step S819, where the determined reset operation is initiated by providing an instruction to the screen reset module 513. After that, the procedure proceeds to step S820, where the content of the setting value DB 520 is updated via the setting value management module 511.

If it is determined in step S817 that an instant reflection instruction is not found, the procedure proceeds to step S818. In step S818, the internal device state check module 515 waits for the internal device state matching the initiation condition to be cancelled. If cancellation of the state is confirmed, the procedure proceeds to step S820, where the content of the setting value DB 520 is updated via the setting value management module 511.

With the above-described configuration and operations, the second embodiment is modified by adding steps S813 to S816 so as to, if there are a plurality of reset types that need to be initiated, enable control that initiates a reset operation having the highest intensity to be performed based on the reset intensity stored in the reset condition DB 530. Accordingly, in addition to the effects obtained by the first and second embodiments, the present embodiment can avoid the redundancy of processing because even when a plurality of setting items are changed, and forced reset operations are designated with respect to the setting items, it is only necessary to execute a reset operation having the highest intensity.

With this configuration, for example, if data synchronization is performed with respect to both a setting change of the item represented by "copy_settings.force_mono_print" and a setting change of changing the value of the item represented by "user_auth_settings.auth_onoff" to 0 during operation of a copy screen in a currently logged-in device, "copy screen reset" is designated with respect to the former, and "log-out" is designated with respect to the latter as the reset types. Among the two reset processing operations, the log-out operation has a higher reset intensity, and thus the log-out operation is carried out, and thereafter settings data is synchronized. Also, after only data having a condition for initiating a copy screen reset operation is synchronized, the copy screen reset operation is performed. In this way, it is possible to perform control so as to provide a consistency to the user by performing the required minimum reset operation.

According to the embodiments described above, it is possible to, when a setting change is made to all devices that are managed by an administrator, make the setting change at a time to all of the devices even if there is a device in use, as well as preventing users from executing processing in unexpected settings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-140869, filed Jul. 8, 2014 which is hereby incorporated by reference herein in its entirety.

What is claimed is:

1. A device comprising:
a storage unit configured to store settings data for each of a plurality of setting items; and
a processor and a memory coupled to each other and cooperating to act as units comprising:
(a) a receiving unit configured to receive, from a server via a network, information including difference data between settings data stored in the server and the settings data stored in the storage unit;
(b) a processing unit configured to execute reset processing according to a setting item of the received information, the reset processing being executed during at least one of a log-in state and a state in which a predetermined operation screen is displayed in a display unit of the device; and
(c) an update unit configured to update the settings data stored in the storage unit by using the information including the difference data after execution of the reset processing.

2. The device according to claim 1, wherein the reset processing is log-out processing of resetting a log-in state in which a user logs into the device.

3. The device according to claim 1, further comprising:
a display unit configured to display an operation screen for operating the device,
wherein the reset processing is processing for causing the operation screen displayed on the display unit to transition to a specific screen.

4. The device according to claim 1, wherein if the difference data included in the information received by the receiving unit is difference data of settings data regarding a first setting item and the operation state of the device corresponds to a predetermined operation state, the update unit updates the settings data stored in the storage unit after execution of the reset processing, and
wherein if the difference data included in the information received by the receiving unit is difference data of settings data regarding a second setting item that is different from the first setting item and the operation state of the device corresponds to the predetermined operation state, the update unit updates the settings data stored in the storage unit after the operation state of the device no longer corresponds to the predetermined operation state.

5. The device according to claim 1, further comprising
a database in which data that defines intensity for each of a plurality of types of reset processing operations is stored,
wherein if predetermined operation states respectively associated with a plurality of setting items corresponding to a plurality of difference data sets included in the information received by the receiving unit are satisfied, the processing unit executes a reset processing operation determined based on the database from among the plurality of types of reset processing operations corresponding to the plurality of setting items.

6. The device according to claim 1, further comprising
a display unit configured to display information indicating that the reset processing is to be performed when executing the reset processing.

7. The device according to claim 1, wherein the device is a multifunction peripheral.

8. A system including a server and a device connected to the server via a network, the system comprising:
a storage unit configured to store settings data for each of a plurality of setting items; and
a processor and a memory coupled to each other and cooperating to act as units comprising:
(a) a receiving unit configured to receive, from the server, information including difference data between settings data stored in the server and the settings data stored in the storage unit;
(b) a processing unit configured to execute reset processing according to a setting item of the received information, the reset processing being executed during at least one of a log-in state and a state in which a predetermined operation screen is displayed in a display unit of the device; and
(c) an update unit configured to update the settings data stored in the storage unit by using the information including the difference data after execution of the reset processing.

9. A control method for controlling a device, the method comprising:
receiving, from a server via a network, information including difference data between settings data stored in the server and settings data stored in a storage unit provided in the device;
executing reset processing according to a setting item of the received information, the reset processing being executed during at least one of a log-in state and a state in which a predetermined operation screen is displayed in a display unit of the device; and
updating the settings data stored in the storage unit by using the information including the difference data after execution of the reset processing.

10. A non-transitory computer-readable storage medium storing a program to cause a computer to execute a method comprising:
a storing control procedure to store settings data for each of a plurality of setting items in a storage unit;
a receiving control procedure to receive, from a server via a network, information including difference data between settings data stored in the server and the settings data stored in the storage unit;
a reset control procedure to reset processing according to a setting item of the received information, the reset processing being executed during at least one of a log-in state and a state in which a predetermined operation screen is displayed in a display unit of the computer; and
an update control procedure to update the settings data stored in the storage unit by using the information including the difference data after execution of the reset processing.

* * * * *